Dec. 18, 1962 R. D. UMBACH 3,069,353
TREATMENT OF SOUR HYDROCARBONS
Filed Feb. 1, 1960
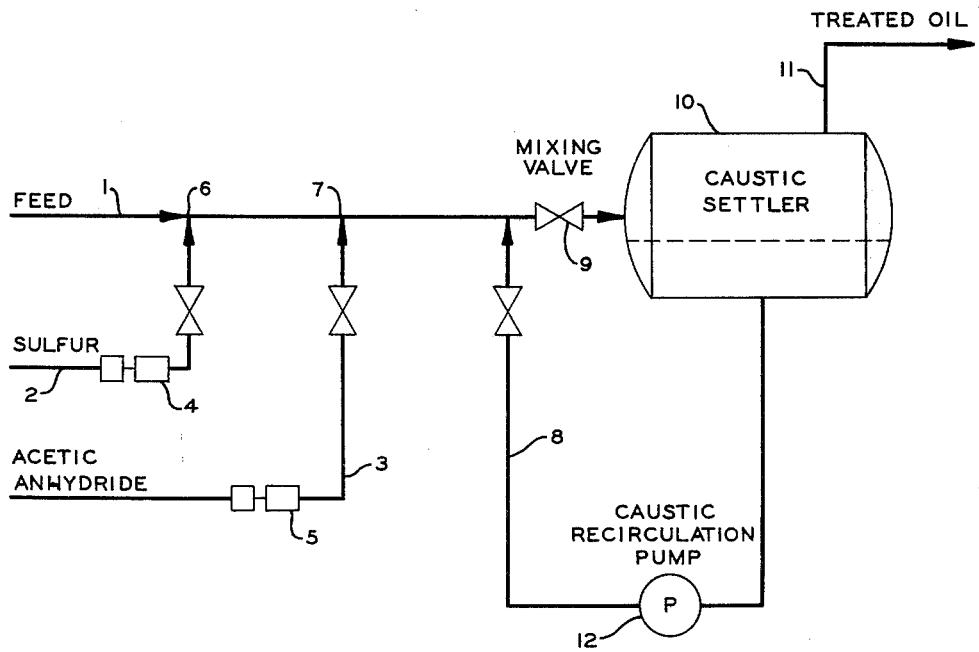
INVENTOR.
R. D. UMBACH
BY
Hudson & Young
ATTORNEYS United States Patent Office 3,069,353
Patented Dec. 18, 1962

3,069,353
TREATMENT OF SOUR HYDROCARBONS
Roy D. Umbach, Okmulgee, Okla., assignor to Phillips Petroleum Company, a corporation of Delaware
Filed Feb. 1, 1960, Ser. No. 5,870
3 Claims. (Cl. 208—204)

This invention relates to treatment of sour hydrocarbons. In one of its aspects, it relates to the treatment of a jet fuel by first admixing therewith a small quantity of sulfur and then treating the fuel with acetic anhydride and then with caustic. In a further aspect of the invention, hydrocarbon distillates which can be gasoline, stove and lamp fluid, jet fuels, kerosenes, and heating oils can be sweetened and have been sweetened by the use of controlled amounts of acetic anhydride and sulfur followed by a caustic wash, for example, 50 Baumé caustic.

In U.S. Patent 2,889,195, issued June 2, 1959, there is set forth and claimed a method of refining petroleum oil, comprising admixing with a petroleum oil stock in the liquid phase an organic acid anhydride in a minimum amount of at least 0.001 percent by weight of the oil, thereafter agitating the admixture with a concentrated aqueous alkali hydroxide solution containing at least 25 percent by weight of alkali hydroxide, the amount of said alkali hydroxide being sufficient to neutralize the acid of said anhydride produced by reactions between said anhydride and other substances present in said oil, the volume of said concentrated alkali hydroxide solution being sufficient to obtain intimate mixing, and separating the treated oil from the resultant mixture. The patent points out that most crude petroleums include various constituents, sulfur compounds, phenolic and nitrogenous bodies, acids and the like, which impart to the various fractions produced in the processing of the crude petroleum undesirable physical and chemical characteristics. Also, the patentee points out that, in catalytic cracking of petroleum fractions, there is produced refractory recycle stock which is withdrawn from the system and which includes a large proportion which falls in the household fuel or burning oil range and that this stock is commonly referred to as "light cycle oil" or "number 2 fuel oil" and is found to be unstable in storage, losing color rapidly and developing gummy precipitates and possessing highly undesirable odors, all of which makes the product undesirable and often a source of mechanical difficulty to use. The patentee prefers acetic anhydride as the reagent for use in the first stage treatment and concentrated aqueous sodium hydroxide solution for the second stage treatment. Other acid anhydrides, both aliphatic and aromatic, may be used according to the patentee.

This invention relates to a considerable improvement in a process which is effected using acetic anhydride and caustic which are the agents used in said patent.

The general background of this sweetening process, therefore, is found expressed in the said patent and, of course, is known to one skilled in the art at this time.

It has been found, according to the present invention, that certain stocks mentioned herein, for some reason, are not sweetened by the process of the above-mentioned patent but that, if the oil charge is admixed with a small quantity of sulfur and with a small quantity of acetic anhydride and then caustic washed, the product is sweetened.

An object of this invention is to provide a treatment of sour hydrocarbons. Another object of the invention is to provide a sweetening treatment for jet fuels. Still another object of the invention is to provide a sweetening process which is applicable to hydrocarbon distillates which are gasoline, stove and lamp fluid, jet fuels, kerosenes, and heating oils, for example, number 1 heating oils. It is a further object of this invention to provide an improvement in a process in which a sour hydrocarbon is sweetened using controlled amounts of acetic anhydride and caustic wash. Other aspects, objects and the several advantages of this invention will be apparent from a study of this disclosure, the drawing and the appended claims.

According to the present invention, there is provided a process for the sweetening of a hydrocarbon or oil which comprises admixing with the hydrocarbon or oil a small quantity of sulfur and then treating said hydrocarbon or oil with acetic anhydride and following said treatment with a caustic or alkali treatment.

Referring to the drawing, oil charged at 1 is admixed with sulfur charged at 2 and then with acetic anhydride charged at 3. Pumps 4 and 5 are proportioning pumps and the distance of time lag between points 6 and 7, which are the junctures, respectively, of pipes 1 and 2 and pipes 1 and 3, is sufficient to allow the sulfur to become thoroughly and intimately admixed with the oil charge before the acetic anhydride is added thereto. The mixture thus obtained continues through pipe 1 and is admixed with circulating caustic solution from pipe 8 passing through mixing valve 9 and then into treatment tank 10 wherein treatment is accomplished or completed, treated oil being taken off through pipe 11 and caustic which has settled being recycled by pipe 8 and pump 12.

Although it does not now appear to be critical how much time the sulfur is in the oil charge before the acetic anhydride is added, it is preferred that the sulfur be thoroughly admixed with the charge. The critical feature of the invention is found in the a priori addition of the sulfur to the charge.

For the stocks now known to be treated by the acetic anhydride and caustic wash combination of steps, this invention can use sulfur generally in amounts in the range of approximately .002–.0035 weight percent for very satisfactory results. Obviously, one skilled in the art in possession of this disclosure, having studied the same, will recognize that sulfur in too large a quantity is to be avoided and, therefore, can determine by mere routine test just how much sulfur is sufficient to obtain a very satisfactory result. Thus, although the range given is now preferred and is, therefore, considered inventive, the primary concept of the invention is in the addition of the sulfur and not primarily in the addition of any specific or fixed amount of sulfur.

Similarly, for the quantities and proportions of the other treating agents which are used.

It has been determined that distillate containing hydrogen sulfide should be caustic washed for treatment according to the invention. Water in the distillate is detrimental to the full effectiveness of the acetic anhydride. Caustic used should be preferably at least about 40° Baumé–50° Baumé since weaker caustics are not always adequate. 50–100 parts per million acetic anhydride were generally found adequate and additional amounts were not found to possess appreciable extra benefits. Sulfur in excess of approximately .0034 weight percent will tend to render the stock corrosive. However, upon storage, the free sulfur appears to continue to react and the product will become less corrosive or non-corrosive.

The sulfur can be added to the oil or hydrocarbon being treated as a solution in a solvent. The preferred solvent is the specific oil being treated; e.g., jet fuel as the solvent for elemental sulfur when jet fuel is being processed, burning oil as the solvent when burning oil is being treated, etc.

Generally, in treating each of the aforesaid specifically mentioned hydrocarbon fractions, sulfur in amounts of .002–.0035 weight percent was added to the hydrocarbon at room temperature and at atmospheric pressure. This was followed by addition of 50–75 parts per million acetic anhydride. The reaction time was found very short requiring only slight mixing and a matter of seconds to be completed. The admixture was then caustic washed with 50° Baumé caustic and settled. Settling time allowed was 1–2 hours, a clean break from the caustic being obtained. The stocks, which were sweetened, originally contained 0.003 to approximately 0.005 weight percent mecaptan. It was found that the amount of sulfur and/or acetic anhydride required was dependent upon the mercaptan content of the stream to be sweetened.

The following tables show results obtained.

TABLE I

| Hours storage | Caustic prewash, Be. | Treatment [1] | | | | | | Product tests [1] | | | | |
|---|---|---|---|---|---|---|---|---|---|---|---|---|
| | | Acetic anhydride, p.p.m. | Caustic, Be. | Mixing time, sec. | Decanted | Filtered | Water wash | Color, Saybolt | Corrosion test | Doctor test | Mercaptan sulfur, weight percent |
| 0 | 7.4 | 0 | 50 | 30 | No | No | No | 18 | Neg | Pos | .00180 |
| 0 | 7.4 | 0 | None | 30 | No | No | No | 18 | | Pos | .00200 |
| 0 | 7.4 | 500 | 50 | 30 | No | No | No | 18 | Neg | Pos | .00094 |
| 24 | | | | | | | | 7 | | Neg | .00040 |
| 0 | 7.4 | 1,000 | 50 | 30 | No | No | No | 18 | Neg | Pos | .00090 |
| 24 | | | | | | | | 15 | | Neg | |
| 0 | 7.4 | 500 | 50 | 300 | No | No | No | 18 | | Pos | |
| 24 | | | | | | | | 0 | | Neg | .00039 |
| 0 | 7.4 | 1,500 | 50 | 30 | No | No | No | 18 | | Pos | .00073 |
| 24 | | | | | | | | 16 | | Neg | .00030 |
| 0 | 7.4 | 100 | 50 | 30 | No | No | No | 18 | | Pos | .00091 |
| 24 | | | | | | | | 3 | | Neg | .00047 |
| 0 | 7.4 | 100 | 50 | 30 | Yes | Yes | Yes | 19 | Neg | Pos | .00091 |
| 24 | | | | | | | | 19 | | Pos | .00091 |
| 0 | None | 0 | 50 | 30 | Yes | No | No | 19 | | Pos | .00190 |
| 24 | | | | | | | | 18 | | Pos | |
| 0 | 7.4 | 0 | 50 | 30 | Yes | No | Yes | 19 | | Pos | |
| 24 | | | | | | | | 19 | | Pos | |
| 0 | None | 25 | 50 | 30 | Yes | No | Yes | 19 | | Pos | .00170 |
| 24 | | | | | | | | 18 | | Pos | .00150 |
| 0 | 7.4 | 25 | 50 | 30 | Yes | No | Yes | 18 | | Pos | .00160 |
| 24 | | | | | | | | | | Pos | .00150 |
| 0 | None | 50 | 50 | 30 | Yes | No | Yes | 19 | | Pos | .00165 |
| 24 | | | | | | | | | | Pos | .00145 |
| 0 | 7.4 | 50 | 50 | 30 | Yes | No | Yes | 19 | | Pos | .00153 |
| 24 | | | | | | | | 18 | | Pos | .00144 |
| 0 | None | 100 | 50 | 30 | Yes | No | Yes | 19 | | Pos | .00165 |
| 24 | | | | | | | | 19 | | Pos | .00149 |
| 0 | 7.4 | 100 | 50 | 30 | Yes | No | Yes | 19 | | Pos | .00155 |
| 24 | | | | | | | | 19 | | Pos | .00145 |
| 0 | None | 200 | 50 | 30 | Yes | No | Yes | 20 | | Pos | .00157 |
| 24 | | | | | | | | 19 | | Pos | .00149 |
| 0 | 7.4 | 200 | 50 | 30 | Yes | No | Yes | 20 | | Pos | |
| 24 | | | | | | | | 19 | | Pos | .00147 |
| 0 | None | 500 | 50 | 30 | Yes | No | Yes | 20 | | Pos | .00150 |
| 24 | | | | | | | | 19 | | Pos | .00117 |
| 0 | 7.4 | 500 | 50 | 30 | Yes | No | Yes | 10 | | Pos | .00110 |
| 24 | | | | | | | | 19 | | Pos | .00115 |

[1] Treatment and tests on product-burning oil. Original color, Saybolt, +20. Original RSH, .00360 weight percent.

NOTE.—850 ml. samples used, but no sulfur used.

TABLE II

| Hours storage | Caustic prewash, Bé. | Treatment [1] | | | | | | Product tests [1] | | | | |
|---|---|---|---|---|---|---|---|---|---|---|---|---|
| | | Acetic anhydride, p.p.m. | Caustic, Bé. | Mixing time, sec. | Decanted | Filtered | Water wash | Color, Saybolt | Corrosion test | Doctor test | Mercaptan sulfur, weight percent |
| 0 | 7.4 | 50 | 50 | 30 | Yes | No | No | 20 | | Pos | .00148 |
| 24 | | | | | | | | 20 | | Pos | .00148 |
| 48 | | | | | | | Yes | 20 | | Pos | |
| 0 | 7.4 | 100 | 50 | 30 | Yes | No | No | 20 | | Pos | .00143 |
| 24 | | | | | | | | 20 | | Pos | .00148 |
| 48 | | | | | | | Yes | 20 | | Pos | |
| 0 | 7.4 | 150 | 50 | 30 | Yes | No | No | 20 | | Pos | |
| 24 | | | | | | | | 20 | | Pos | |
| 48 | | | | | | | Yes | 20 | | Pos | .00148 |
| 0 | 7.4 | 200 | 50 | 30 | Yes | No | No | 20 | | Pos | .00150 |
| 24 | | | | | | | | 20 | | Pos | .00148 |
| 48 | | | | | | | Yes | 20 | | Pos | .00148 |
| 48 | 7.4 | 50 | 50 | 30 | Yes | No | No | 20 | | Pos | .00108 |
| 48 | | 100 | | | | | | | | Pos | .00104 |
| 48 | | 150 | | | | | | | | Pos | .00128 |
| 48 | | 200 | | | | | | | | Pos | .00103 |

[1] Treatment and tests on burning oil. Original color, Saybolt, +20. Original RSH, .00300 weight percent.

NOTE.—850 ml. samples used, but no sulfur used.

TABLE III

| Hours storage | Caustic prewash, Bé. | Sulfur solution, milliliters, .072 weight percent sulfur | Acetic anhydride, p.p.m. | Caustic, Bé. | Mixing time, sec. | Decanted | Filtered | Water wash | Color Saybolt | Corrosion test | Doctor test | Mercaptan sulfur, weight percent |
|---|---|---|---|---|---|---|---|---|---|---|---|---|
| 0 | 7.4 | 10 | 100 | 50 | 30 | Yes | No | No | 21 | | Pos | .00128 |
| 24 | | | | | | | | | 21 | Neg | Sl. pos | .00069 |
| 48 | | | | | | | | | 19 | Neg | Sl. pos | .00069 |
| 0 | 7.4 | 20 | 100 | 50 | 30 | Yes | No | No | 21 | | Pos | .00074 |
| 24 | | | | | | | | | 21 | Neg | Neg | .00049 |
| 48 | | | | | | | | | 19 | Neg | Neg | .00045 |
| 0 | 7.4 | 10 | 200 | 50 | 30 | Yes | No | No | 21 | | Pos | |
| 24 | | | | | | | | | 21 | Neg | Pos | .00079 |
| 48 | | | | | | | | | 19 | Neg | Pos | .00080 |
| 0 | 7.4 | 20 | 400 | 50 | 30 | Yes | No | No | 21 | | Pos | .00074 |
| 24 | | | | | | | | | 21 | Neg | Neg | .00040 |
| 48 | | | | | | | | | 19 | Neg | Neg | .00040 |
| 0 | 7.4 | 30 | 50 | 50 | 30 | Yes | No | No | 22 | Neg | Pos | .00074 |
| 24 | | | | | | | | | 18 | Neg | Sl. pos | .00074 |
| 0 | 7.4 | 30 | 100 | 50 | 30 | Yes | No | No | 21 | Neg | Sl. pos | .00059 |
| 24 | | | | | | | | | | Neg | Neg | |
| 0 | 7.4 | 40 | 50 | 50 | 30 | Yes | No | No | 22 | Pos | Sl. pos | .00054 |
| 24 | | | | | | | | | 19 | Neg | Neg | .00049 |
| 0 | 7.4 | 40 | 100 | 50 | 30 | Yes | No | No | 22 | Marg | Neg | .00049 |
| 24 | | | | | | | | | 19 | Neg | Neg | .00049 |
| 0 | 7.4 | 35 | 0 | 50 | 30 | Yes | No | No | 20 | | Pos | .00100 |
| 0 | None | 35 | 50 | 20 | 30 | Yes | No | No | 21 | | Pos | .00218 |
| 24 | | | | | | | | | | | Pos | .00138 |
| 0 | None | 35 | 100 | 20 | 30 | Yes | No | No | | | Pos | .00208 |
| 24 | | | | | | | | | | | Pos | .00143 |
| 0 | None | 35 | 50 | 7.4 | 30 | Yes | No | No | 21 | | Pos | .00226 |
| 24 | | | | | | | | | | | Pos | .00206 |
| 0 | None | 35 | 100 | 7.4 | 30 | Yes | No | No | 21 | | Pos | .00230 |
| 24 | | | | | | | | | 21 | | Pos | .00206 |
| 0 | None | 35 | 50 | 50 | 30 | Yes | No | No | 21 | Neg | Pos | .00050 |
| 0 | None | 35 | 100 | 50 | 30 | Yes | No | No | 21 | Neg | Pos | |

[1] Treatment and tests on product-burning oil. Original color, Saybolt, +21. Original RSH, .00310 weight percent.

NOTE.—850 ml. samples used, and sulfur used.

TABLE IV

| Hours storage | Caustic prewash, Bé. | Sulfur solution, milliliters, .072 weight percent sulfur | Acetic anhydride, p.p.m. | Caustic, Bé. | Mixing time, sec. | Decanted | Filtered | Water wash | Color Saybolt | Corrosion test | Doctor test | Mercaptan sulfur, weight percent |
|---|---|---|---|---|---|---|---|---|---|---|---|---|
| 0 | 7.4 | [2] 30 | 100 | 50 | 30 | Yes | No | No | 28 | Neg | Pos | .00051 |
| 48 | | | | | | | | | | Neg | Neg | .00036 |
| 0 | 7.4 | 30 | 100 | 50 | 30 | Yes | No | No | 28 | | Pos | .00100 |
| 48 | | | | | | | | | | | Pos | .00080 |
| 0 | None | 30 | 100 | 50 | 30 | Yes | No | No | 28 | | Pos | .00154 |
| 48 | | | | | | | | | | | Pos | .00080 |
| 0 | None | 30 | 0 | 50 | 30 | Yes | No | No | 28 | | Pos | .00258 |
| 48 | | | | | | | | | | | Pos | .00206 |
| 0 | 7.4 | [2] 25 | 100 | 50 | 30 | Yes | No | No | 28 | Neg | Pos | .00057 |
| 72 | | | | | | | | | | | Neg | |
| 0 | 7.4 | [2] 25 | 0 | 50 | 30 | Yes | No | No | 28 | Neg | Pos | .00258 |
| 72 | | | | | | | | | | | Pos | .00250 |
| 0 | 7.4 | 0 | 0 | 50 | 30 | Yes | No | No | | | | |

[1] Treatment and tests on heavy straight run gasoline. Original color, Saybolt, +28. Original RSH, .0035 weight percent.
[2] Hydrocarbons were water washed and filtered after prewash.

NOTE.—850 ml. samples used, and sulfur used.

Identification Tests on Hydrocarbons

| | Jet fuel (JP 4) | No. 1 burning oil | Hvy. st. run gasoline |
|---|---|---|---|
| Gravity, °API | 54.5 | 41.5 | 53.8 |
| R.V.P | 2.5 | | 1.3 |
| Flash, TCC, °F | | 140 | |
| Pour point, °C | | −25 | |
| Distillation: | | | |
| I.B.P | 160 | 355 | 204 |
| 5% evap | 220 | 378 | 235 |
| 10% | 240 | 392 | 245 |
| 20% | 257 | 407 | 258 |
| 30% | 270 | 422 | 265 |
| 40% | 280 | 437 | 273 |
| 50% | 285 | 452 | 280 |
| 60% | 289 | 468 | 285 |
| 70% | 297 | 485 | 290 |
| 80% | 308 | 506 | 302 |
| 90% | 328 | 532 | 320 |
| End point | 365 | 565 | 360 |

To further illustrate my invention, in a specific operation, 1000 barrels of raw jet fuel (JP 4) is prewashed with 7.4 Bé. caustic in a volume ratio of 1:1 at ambient conditions; the separated fuel is then thoroughly admixed with sulfur, the sulfur content being 0.00256 weight percent of the total admixture; the sulfur is added to the jet fuel as a solution in jet fuel, 147 gallons of jet fuel added being saturated (0.729 weight percent) with sulfur; to this total admixture is added acetic anhydride to result in 50 parts per million acetic anhydride in the total admixture; the admixture is thoroughly admixed for 30 seconds; then the total admixture is thoroughly admixed with 40 Bé. caustic (1:1 volume ratio), and the hydrocarbon phase is separated therefrom; after 24 hours' storage, the fuel is non-corrosive and is doctor negative (sweet). The original mercaptan sulfur is reduced from 0.0036 weight percent to 0.00047 weight percent.

Similar tests were run with jet fuel, burning oils, etc., some with and some without the prewash with dilute caustic; various sulfur quantities and various acetic anhydride quantities were used as shown in the above tables with the test results. Some tests were run in the presence of air and some in the presence of natural gas.

It is not understood at this time why some hydrocarbons can be sweetened in accordance with the process of United States Patent No. 2,889,195, and why some stocks cannot be so-sweetened. However, those stocks tested which could not be sweetened using the process of 2,889,195 were sweetened when processed in accordance with my invention. One skilled in the art and in possession of my disclosure can routinely test his stocks; those which do not sweeten without the sulfur treatment of my invention will successfully sweeten when processed in accordance with my invention.

The specific reaction or reactions which occur in my invention are not understood. It is believed that the added sulfur either catalyzes the formation of harmless sulfur compounds from the detrimental sulfur compounds (e.g., mercaptans and related compounds) present in the unprocessed hydrocarbon or acts as a synergist in the formation of the harmless compounds.

Reasonable variation and modification are possible within the scope of the foregoing disclosure, drawing and the appended claims to the invention, the essence of which is that in the known treatment of hydrocarbon fractions to sweeten the same employing acetic anhydride, followed by a caustic wash, whenever the treatment is inoperative or insufficiently operative, it can be rendered entirely satisfactory by an a priori addition of a small amount of sulfur to the stock to be treated.

I claim:

1. A method of sweetening a hydrocarbon fuel having an API gravity between about 41.5 and about 54.5, an initial boiling point between about 160° F. and about 355° F., and an end point between about 360° F. and about 565° F. which comprises adding sulfur in an approximate amount of 0.002–0.0035 weight percent of the fuel thereto, then adding approximately 50–75 parts per million acetic anhydride to the fuel and then caustic washing the fuel thus treated and recovering the treated fuel from the operation.

2. The method of claim 1 wherein said hydrocarbon comprises a jet fuel having the following characteristics: gravity, about 54.5° API; Reid vapor pressure, about 2.5; and distillation curve approximate temperatures in degrees F., initial boiling point 160, 5 percent 220, 10 percent 240, 20 percent 257, 30 percent 270, 40 percent 280, 50 percent 285, 60 percent 289, 70 percent 297, 80 percent 308, 90 percent 328, and end point 365.

3. A method of sweetening a jet fuel having the following characteristics: gravity, about 54.5° API; Reid vapor pressure, about 2.5; and distillation curve approximate temperatures in degrees F., initial boiling point 160, 5 percent 220, 10 percent 240, 20 percent 257, 30 percent 270, 40 percent 280, 50 percent 285, 60 percent 289, 70 percent 297, 80 percent 308, 90 percent 328, and end point 365, which comprises adding sulfur in an approximate amount of 0.002–0.0035 weight percent of the fuel thereto, then adding approximately 50–75 parts per million acetic anhydride to the fuel and then caustic washing the fuel thus treated and recovering the treated fuel from the operation.

References Cited in the file of this patent

UNITED STATES PATENTS

| | | |
|---|---|---|
| 2,739,101 | Gordon et al. | Mar. 20, 1956 |
| 2,889,195 | Hoover | June 2, 1959 |